(No Model.) 2 Sheets—Sheet 1.
C. H. BOWMAN.
HAY TEDDER.
No. 446,728. Patented Feb. 17, 1891.
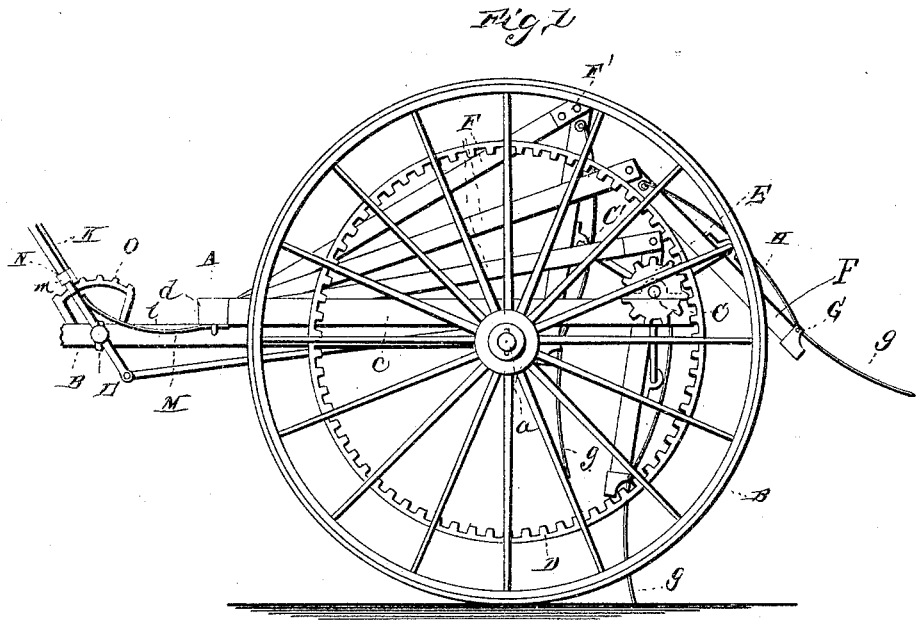
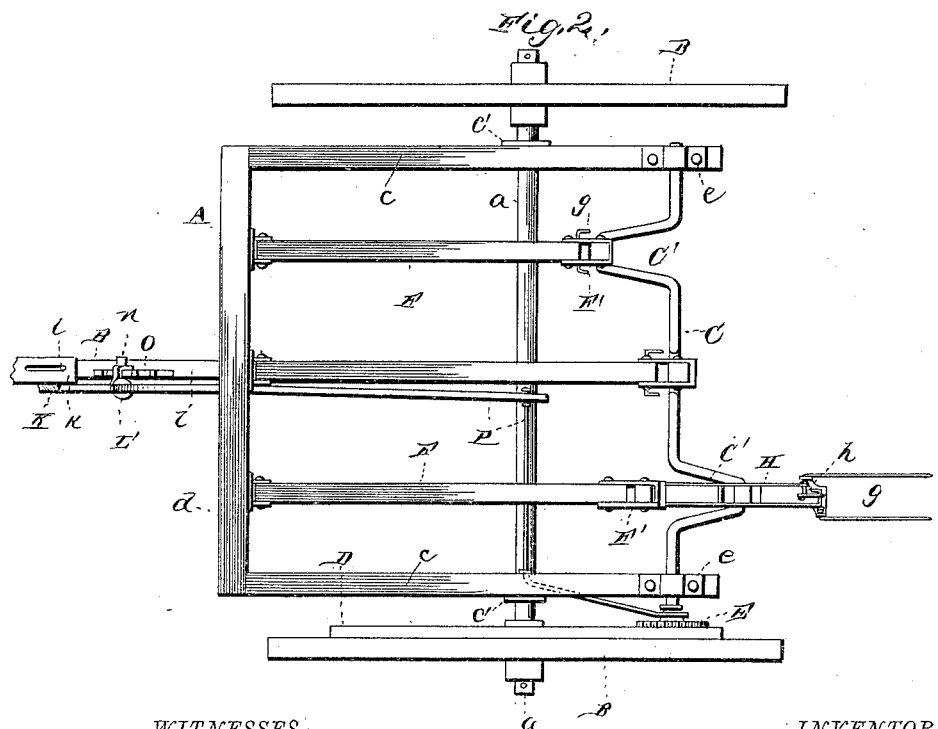
WITNESSES
INVENTOR
Charles H. Bowman.
by E. W. Anderson
his Attorney

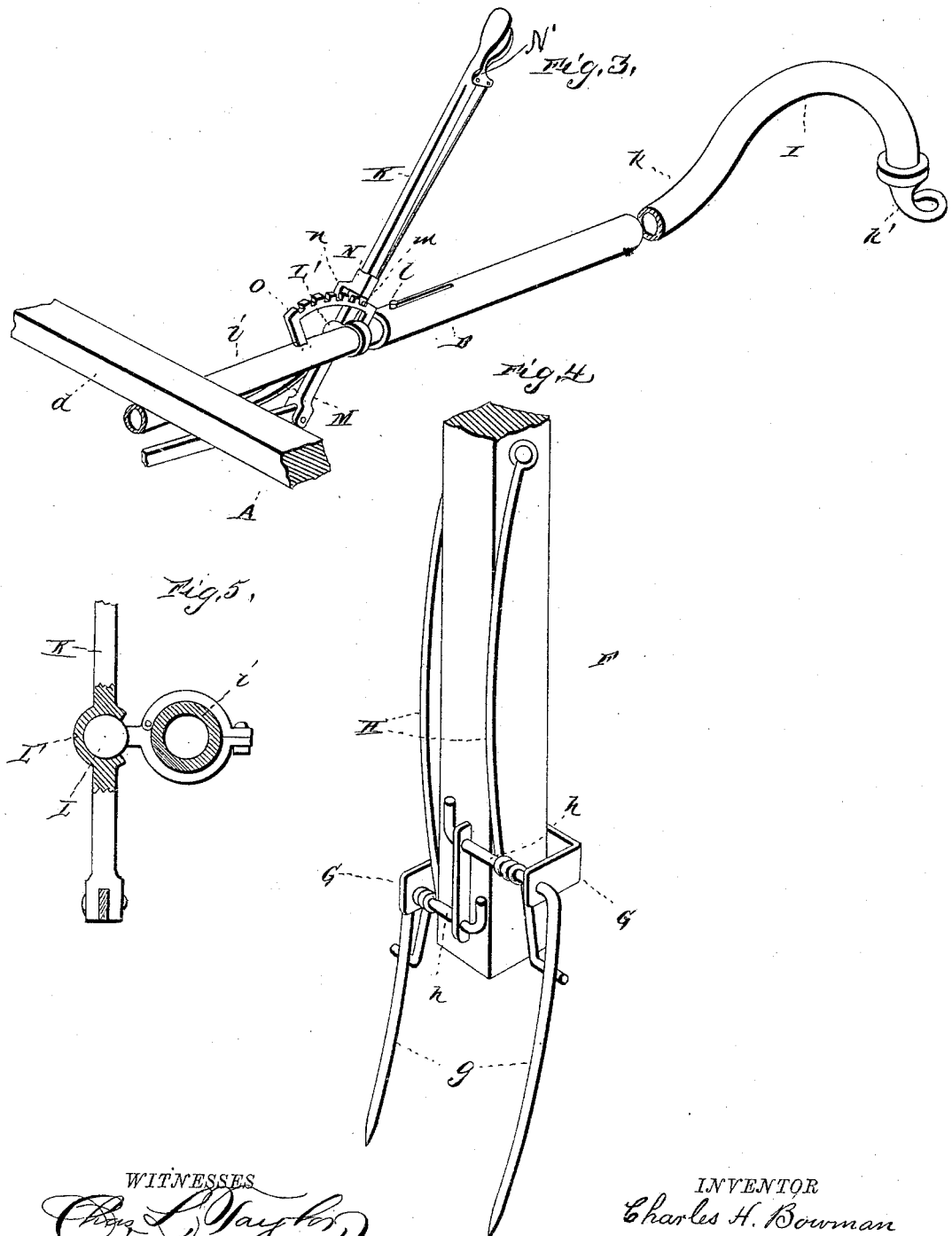

UNITED STATES PATENT OFFICE.

CHARLES H. BOWMAN, OF ALLIANCE, OHIO.

HAY-TEDDER.

SPECIFICATION forming part of Letters Patent No. 446,728, dated February 17, 1891.

Application filed June 12, 1890. Serial No. 355,255. (No model.)

*To all whom it may concern:*

Be it known that I, CHARLES H. BOWMAN, a citizen of the United States, and a resident of Alliance, in the county of Stark and State of Ohio, have invented certain new and useful Improvements in Hay-Tedders; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a representation of my device in side elevation. Fig. 2 is a plan view. Fig. 3 is a detail of the lever mechanism. Fig. 4 is a detail of one of the forks; Fig. 5, a detail view showing the ball-and-socket joint for pivoting the lever to the tongue.

My invention relates to new and useful improvements in hay-tedders.

The object of the invention is to provide a tedder which may be readily attached to the rear of a mowing-machine and which will be simple in construction and effective in its operation.

With these objects in view the invention consists in the novel construction and combination of parts hereinafter fully described, specifically claimed, and clearly illustrated in the accompanying drawings.

In the drawings, A represents the main frame, which is mounted upon the axle $a$ and wheels $b$, and consists of the side pieces $c$ and end piece $d$. Near its ends the axle is provided with shoulders $c'$, which form bearings for the side pieces $c$. These side pieces are provided near their rear ends with bearings $e$, in which are loosely mounted the opposite ends of a crank-shaft C, which is actuated by a pinion E on one end of the said shaft, which engages an annular gear D on one of the main wheels.

F represents the fork-bars, (three being shown, but any number may be used,) which are formed in two sections connected by the hinge F', as shown. These fork-bars are pivoted at their forward ends to the cross-piece $d$ of the frame in such a manner as to allow a free vertical movement. The opposite sections of the bars are secured to the cranks C' of the crank-shaft C. At the rear ends of these fork-bars are secured bearings G, in which are hung the two fork-tines $g$, each tine being formed and supported independent of the other. The upper ends of the tines are bent to form arms $h$, which enter the bearings G.

The letters H H, &c., represent curved springs, one for each tine, which are secured at one end to the fork-bars, as shown, their opposite ends being coiled around the bent arms $h$ of the tines $g$, respectively, the tines resting upon and bearing against the ends of such coils. Said springs, besides regulating the movements of the fork-tines, serve also as guards to keep the hay away from the tedder.

The cranks C' of the crank-shaft C are arranged alternately of each other and at different angles, so that the revolution of the crank-shaft will give a differential movement to the fork-bars and forks.

The tedder is designed to be attached to the rear end of a mowing-machine, and for this purpose the tongue B is formed of cylindrical pipe and in two sections $i$ and $k$, connected as hereinafter described. The front section $k$ is provided at its forward end with a suitable coupling-iron $k'$, for attaching it to the rear end of the tongue of the mower, and is curved upwardly, as shown at I, to allow the wheels of the mower to turn thereunder. The section $k$ is of a larger diameter than section $i$, the forward end of which section $i$ is adapted to enter the rear end of the section $k$ and slide therein, its movement being limited by the pin $l$. By this socket connection of the parts the slack between the machines, when starting and stopping, will be taken up and all damage to the tedder therefrom avoided. The outer section $k$ may be removed and an ordinary tongue adjusted to the tedder when it is desired to use it other than in connection with the mower.

K represents the operating-lever, which is mounted upon the tongue of the tedder in position where it may be readily operated from the seat of the mower. This lever is pivotally secured to the tongue by means of a ballbearing L and socket L'. This lever is used both for tilting the fork-frame and for throwing the driving-pinion into and out of gear. The fork-frame is raised or lowered by a movement in a vertical longitudinal plane of the handle K, to which is secured one end of a flat spring M, the opposite end of which slides in a staple which is secured to the fork-frame. The frame and forks are held in the desired adjustment by means of a double dog m on the collar N, connected to the wrist-lever N', which engage teeth or detents on the bracket O. The lateral movement of the lever is prevented by means of a hook n, which is secured to the lever-handle and engages the bracket O.

The driving-pinion is thrown into and out of gear by means of the rod or link connection P between the lever-handle and said pinion, and is done by a lateral movement of said handle, which can only be had when the lever is at either extreme end of the bracket O and the hook n, hereinbefore referred to, is disengaged from the bracket O.

Having thus described the invention, what I claim as new therein, and that for which I desire to secure Letters Patent, is—

1. The herein-described hay-tedder adapted for use in connection with a mowing-machine and having its tongue provided with the upwardly bent or curved forward end and formed of the telescopic sections, and the stop limiting the telescopic movement of said sections, substantially as described.

2. In a hay-tedder, the combination, with the hinged fork-bars pivotally secured to the main frame and secured to the crank-shaft, of the forks having the independent tines, each provided with a horizontally-bent arm engaging bearings in brackets connected to the fork-bar, and the spring coiled around each bent arm, one of its ends secured to the fork-bar and the other bearing against the rear of the tine, substantially as described.

3. In a hay-tedder, the combination, with a tongue formed in adjustable sections, of a lever mounted upon said tongue, said lever having a spring connection with the frame for tilting the fork-bars and a link or rod connection with the driving-pinion, whereby the said pinion may be thrown into and out of gear, substantially as described.

4. In a hay-tedder, the lever K, having the universal joint L L', and the connections M and P between the fork-frame and driving-pinion, respectively, whereby a vertical movement of the said lever will tilt the fork-frame and a horizontal movement of the same will throw said pinion out of gear, substantially as described.

5. The herein-described fork for hay-tedders, having the independent tines, each provided with a horizontally-bent arm engaging bearings in brackets connected to the fork-bar, and the spring coiled around each bent arm, one of its ends secured to the fork-bar and the other bearing against the rear of the tine, substantially as described.

In testimony whereof I affix my signature in presence of two witnesses.

CHAS. H. BOWMAN.

Witnesses:
W. L. CLELAND,
CHARLES E. RICE.